United States Patent Office 2,779,881
Patented Jan. 29, 1957

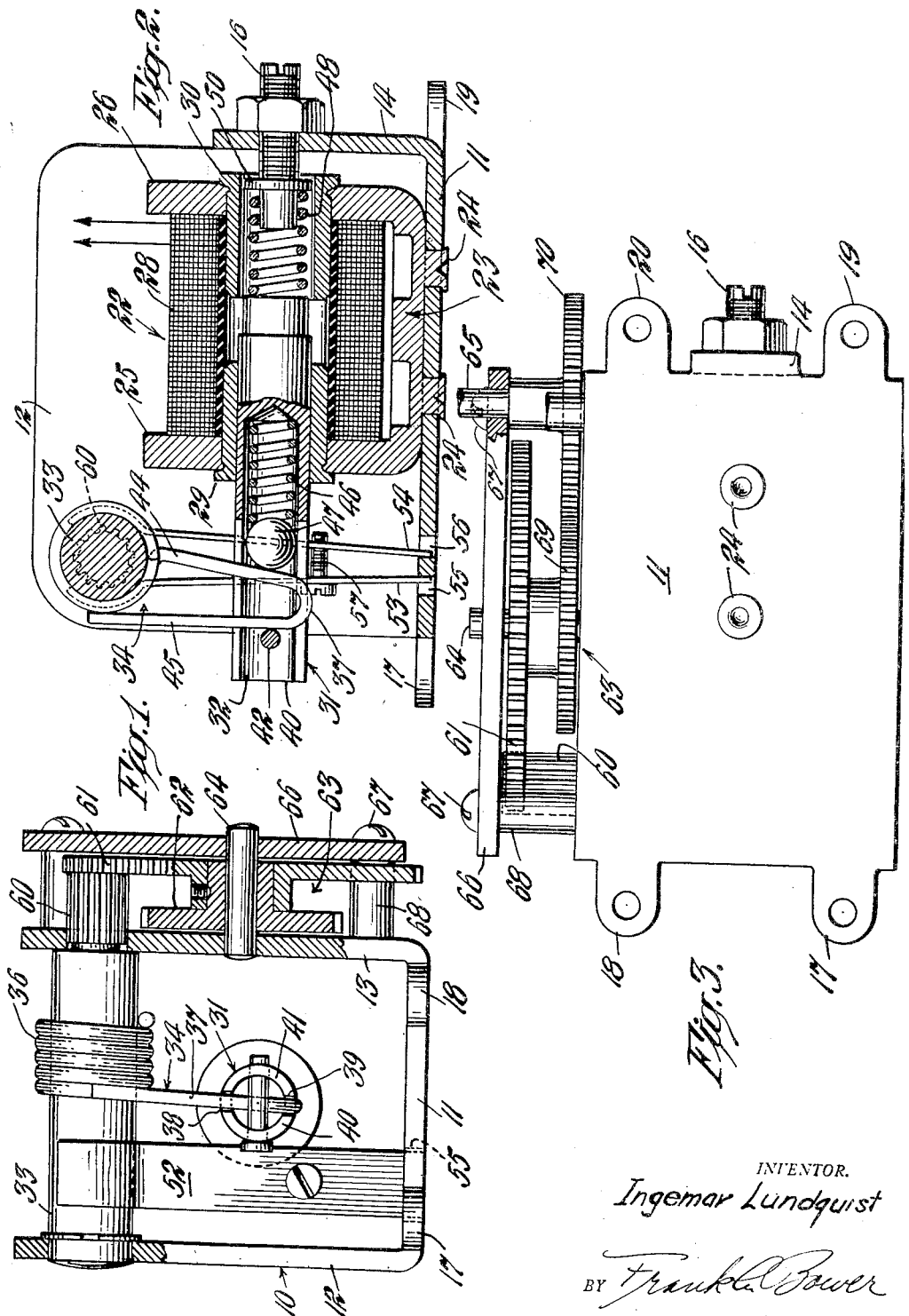

2,779,881

ELECTRIC MOTOR

Ingemar Lundquist, East Orange, N. J., assignor to The Viking Tool & Machine Corporation, Belleville, N. J., a corporation of New Jersey Application October 21, 1952, Serial No. 315,933

4 Claims. (Cl. 310—23)

This invention relates to electric power conversion devices and particularly to electric motors of the solenoid type for converting reciprocatory motion into rotary motion.

An object of this invention is to provide a low-powered electric motor with a negligible amount of inertia that may be started and stopped with little or no drift or overshooting.

Another object of the invention is to provide a low-powered motor with a high torque.

Another object of the invention is to provide a motor that rotates a shaft through small angles quickly and precisely.

Another object of the invention is to provide a motor that does not override the desired setting.

Another object is to provide a motor that is inexpensive to manufacture and strong in construction.

A still further object is to provide an inexpensive motor that is small and compact in size.

Other and further objects will be apparent from the following description taken in connection with the accompanying drawing in which Fig. 1 is an end view of the motor with a fragmentary view of the gear reduction unit;

Fig. 2 is a sectional view of the motor along lines 2—2 of Fig. 1; and

Fig. 3 is a bottom view of the motor.

In Fig. 1, a vibratory motor is shown mounted on a U-shaped base 10 having a bottom plate 11 and side plates 12 and 13. The side plates are bent at right angles to the bottom and from a single piece of sheet metal. A supporting tongue 14 is bent at right angles to the bottom plate and on the same side of the bottom plate as the side plates. The tongue supports a threaded stub 16. Mounting bosses 17, 18, 19, 20 are provided extending from the bottom plate on a suitable panel or support.

A solenoid 22 is held by a U-shaped metal bracket 23. The bracket is fastened to the bottom plate 11 by rivets 24 or other suitable means at the tongue 14 end. The bracket has two end plates 25, 26 transverse to the side plates 12 and 13. A solenoid 28 is supported between the end plates 25, 26 by the bushings 29, 30. The bushings 29, 30 are fastened in the end plates 25, 26. A cylindrical armature 31 is slideably mounted in the bushing 29 with a tubular portion 32 extending from the end of the solenoid between the sides 12 and 13.

At the outer edges of the sides 12 and 13 from the bottom plate 11, a shaft 33 is journaled in the sides above the tubular portion 32. A spring clutch 34 is mounted on the shaft 33 to turn it in one direction and comprises a tightly wound helical spring 36 and an arm 37 integral with the spring 36. The arm 37 extends substantially radially from the shaft 33 and fits into diametrically opposed longitudinally extending slots 38, 39 forming fingers 40, 41. A transverse pin 42 fits into the fingers 40, 41 to press against the arm 37 and turn the clutch and shaft on an actuation stroke of the armature.

The helical coil 36 is tightly wound and the inner diameter is slightly less than the diameter of the shaft. The coil is forced on the shaft to provide a tight snug fit. The arm 37 extends normal to the shaft into the slots 38, 39 between the fingers 40, 41. The arm has a radial member 44 bent normal to the end coil and a tangential member 45 connected between the outer end of the radial member and a point on said end coil spaced from the radial member preferably a tangential point. The tangential member may be welded, brazed or otherwise connected to the end coil. The arm thus forms a rigid member connected at spaced points along the end coil of the helical spring so that the clutch responds without delay to the actuating force of the solenoid. The arm tends to pivot about the inner end of the radial member 44 pressing the coil against the shaft and the tangential member pulls on the spring tightening the coils to grip the shaft and turn it.

A spring 46 is seated inside of the tubular portion 32 and presses a steel ball 47 against the arm 37 on the opposite side from the pin 42. When the actuating force is removed, the ball is pressed by the releasing force against the arm 37 opening the helical coil 36 and releasing the tight grip on the shaft 33.

The armature on the actuating stroke compresses the spring 48 seated in the cup 49 on the inner end of armature against the flange 50 on the threaded stub 16. This spring throws the armature outwardly from the solenoid and returns the arm to the initial position prior to the actuating stroke. This pull and throw of the solenoid 22 on the armature 31 produces a rapid reciprocatory movement which applies successive uni-directional pulls on the arm 37 to turn the shaft 33 small angular increments on each pull. This produces an intermittent rotational turning of the shaft which with the rapidity of movement of the armature produces a substantially continuous rotation of the shaft.

The bushings 29 and 30 have their inner ends spaced to form an air gap in the magnetic path. The inner end of the armature when in the thrown position is in the air gap and when the current is supplied to the solenoid, the end of the armature with the reduced cross-section is drawn into the bushing 30. The setting of the threaded stub 16 controls the amplitude of the armature. By moving the flange 50 inward the spring is compressed and the amplitude of the throw of the armature is reduced. The nut 51 locks the threaded stub in position.

A brake 52 comprising two leaf springs 53, 54 grips the shaft 33 and holds it from return movement. The gripping by the helical coil is substantially greater on the power stroke than the retarding grip of the brake 52 and less on the return strokes so that the shaft is held while the clutch is moved backwards. The leaf springs have curved portions which grip the shaft 33 and flat portions extending down to the base and fitting into slots 55, 56 in the bottom plate 11. A bolt 57 draws the two leaves in position and sets the gripping pressure of the brake on the shaft.

The shaft 33 has a stud 60 extending through the side plate 13 and supporting the shaft 33. A gear 61 is mounted on the end of the stud and engages the gear 62 of the reduction gearing 63 mounted on shafts 64, 65 between the side plate 13 and the outer plate 66. The outer plate 66 is mounted on and spaced from the side plate 13 by the bolts 67 and spacers 68. The gear 61 and gear 69 are mounted on the idler shaft 64. The gear 70 is mounted on the output shaft 65 and meshes with gear 69. The gear 61 is substantially larger than the stud gear 60 with which it meshes and larger than the gear 69. Thus the speed of the output shaft is reduced in relations to the speed of the main shaft 33. The output shaft may be connected to any suitable means for turning through small angles where a precise setting is desired.

The solenoid 33 is connected to a suitable electric current source by the wires 74, 75. Either an alternating current or a pulsating direct current may be applied to the solenoid.

By changing the frequency of the alternating current or the number of direct pulses, the speed of the motor may be increased or decreased. The speed of the motor may be also adjusted by the setting of the threaded stud 16.

It is thus seen that the motor is compact and has a high output torque. The prompt gripping and turning of the shaft provides an instantaneous response to the control.

The small size and light weight of the clutch and armature reduces the effect of the inertia to a minimum. The small increments through which the shaft is turned on each half cycle or pulse permits the arcuate setting of a device coupled to shaft. The step approach over equal increments of movement permits the anticipation of the approach of the desired setting.

The housing for the motor may be made from a single piece of metal. The side walls 12 and 13 are bent to be substantially normal to the bottom plate and support the clutch shaft near the outer edges. The solenoid is nested in between the side walls with the armature extending underneath the shaft. Various modifications may be made in the embodiment described without departing from the invention.

I claim:

1. A vibratory motor comprising a housing, a rotatable shaft mounted on said housing, a spring clutch having coils tightly wound on said shaft normally under a gripping stress, said clutch having an arm attached to one of said coils, a solenoid mounted on said housing and having an armature reciprocally mounted in said solenoid, said armature having a pin engaging said arm to tighten the grip of said coil on said shaft on application of an actuating force and to turn said shaft, a helical spring within said armature holding said arm continuously against said pin, said armature having a seat at the opposite end from said pin and resilient means positioned between said seat and said housing to impart a returning force to said armature to loosen the grip of said coil and return said clutch to the initial position while said shaft remains stationary.

2. A vibratory motor comprising a housing, a rotatable shaft mounted on said housing, a spring clutch having coils tightly wound on said shaft normally under a gripping stress, said clutch having an arm rigidly attached to one of said coils, a solenoid mounted on said housing and having a tubular armature reciprocally mounted in said solenoid, said armature having a pin engaging said arm to tighten the grip of said coil on application of an actuating force and to turn said shaft, a helical spring and a hard ball within said armature holding said arm continuously against said pin, said armature having a seat at the opposite end of said pin and resilient means positioned between said seat and said housing to impart a returning force to said armature to loosen the grip of said coil and return said clutch to the initial position while said shaft remains stationary.

3. A vibratory motor as set forth in claim 2 wherein said housing has an adjustable seat and said resilient means is seated thereagainst to regulate the amplitude of movement of said armature.

4. A vibratory motor as claimed in claim 2 wherein said solenoid has two sleeves, one at each end and spaced a distance apart at their inner ends to form a flux gap therebetween, said armature slideably mounted in one sleeve and moving to telescope with said other sleeve to close said flux gap.

References Cited in the file of this patent

UNITED STATES PATENTS

| | | |
|---|---|---|
| 1,903,231 | Coleman | Mar. 28, 1933 |
| 2,096,458 | Johnson | Oct. 19, 1937 |
| 2,111,550 | Armstrong | Mar. 22, 1938 |
| 2,385,409 | Gardner | Sept. 25, 1945 |
| 2,685,208 | Lundquist | Aug. 3, 1954 |